US012748248B2

(12) United States Patent
Zheng et al.

(10) Patent No.: US 12,748,248 B2
(45) Date of Patent: Sep. 29, 2026

(54) OPTICAL FILTERS WITH HYDROGENATED SILICON CARBIDE AND SYSTEMS AND METHODS OF MAKING THE SAME

(71) Applicant: Fuzhou Photop Optics Co., Ltd., Fuzhou (CN)

(72) Inventors: Zuci Zheng, Fuzhou (CN); Zhixiong Liu, Fuzhou (CN); Changqin Ding, Fuzhou (CN); Jinmin Huang, Fuzhou (CN); Jianhua Zhang, Fuzhou (CN); Guojin He, Fuzhou (CN); Zhe Liu, Fuzhou (CN)

(73) Assignee: Fuzhou Photop Optics Co., Ltd., Fuzhou (CN)

( * ) Notice: Subject to any disclaimer, the term of this patent is extended or adjusted under 35 U.S.C. 154(b) by 183 days.

(21) Appl. No.: 18/582,116

(22) Filed: Feb. 20, 2024

(65) Prior Publication Data

US 2025/0208328 A1 Jun. 26, 2025

(30) Foreign Application Priority Data

Dec. 21, 2023 (CN) ......................... 202311785048.3

(51) Int. Cl.
*G02B 5/28* (2006.01)

(52) U.S. Cl.
CPC .................................... *G02B 5/281* (2013.01)

(58) Field of Classification Search
None
See application file for complete search history.

(56) References Cited

U.S. PATENT DOCUMENTS 9,354,369 B2 5/2016 Hendrix et al.
9,989,684 B2 6/2018 Sprague
2002/0070931 A1* 6/2002 Ishikawa .............. G02B 6/3512 345/204
2010/0313875 A1* 12/2010 Kennedy ............... F24S 70/225 126/714
2016/0289821 A1* 10/2016 Nayak ................ G01B 11/0683
2020/0319386 A1* 10/2020 Chen ................... H01J 37/3426
2020/0408976 A1* 12/2020 Kim ....................... G02B 5/285

* cited by examiner

*Primary Examiner* — Robert E. Tallman
(74) *Attorney, Agent, or Firm* — McAndrews, Held & Mallloy, Ltd.

(57) ABSTRACT

An optical filter, which may include an interference filter having a first material layer and a second material layer stacked on a first side of the substrate, is disclosed. In some examples, the first material layer may include silicon oxide and have a first refractive index, and the second material layer may include a hydrogenated silicon carbide (SiC:H) material with a second refractive index. The SiC:H material layer is defined by a refractive index greater than the silicon oxide material layer in the range of approximately 1.65 to 4.80. The particular refractive index may be adjusted by regulating introduction of a gas, such as methane (CH4), during formation of the SiC:H material layer.

20 Claims, 9 Drawing Sheets

OPTICAL FILTERS WITH HYDROGENATED SILICON CARBIDE AND SYSTEMS AND METHODS OF MAKING THE SAME

BACKGROUND

Optical interference filters are commonly used in the near-infrared spectrum. Such filters may utilize duplicated stacks of layers having different materials with different refractive indexes. Angular shift of the passband center wavelength in such a filter can be reduced by employing layers with a substantially high contrast in the relative refractive indexes. However, to achieve a desired property, the filters can require a large number of layers, adding to the package envelope, cost, and complexity of such filters.

The subject matter of the present disclosure is directed to overcoming, or at least reducing the effects of, one or more of the problems set forth above.

SUMMARY OF THE DISCLOSURE

According to the present disclosure, an interference filter includes a first material layer stacked on a second material layer. The first material has a first refractive index. The second material includes hydrogenated silicon carbide (SiC:H), with a second refractive index different from the first refractive index. In some examples, the second refractive index is greater than the first refractive index.

In some examples, the second refractive index (e.g., of the hydrogenated silicon carbide layer) is within a range of approximately 1.65 to 4.80, inclusive over a spectral range of approximately 800 nm to 1800 nm.

In accordance with disclosed examples, an optical filter includes a substrate (e.g., glass, sapphire, etc.), upon which alternating layers of the first and second material layers are stacked. The layers alternate between first and second (e.g., low and high) refractive indexes. The second material layer, with the second refractive index, may be SiC:H within a range of approximately 1.65 to 4.80, inclusive over a spectral range of approximately 800 nm to 1800 nm. The first refractive index layer can include one or more of $TiO_2$, $Nb_2O_5$, $Ta_2O_5$, $SiO_2$, $Si_xN_y$, SiH, and $SiO_xH_y$, as a list of non-limiting examples, where x and y are numerical values. The disclosed optical filter is configured to have the passband over the spectral range of approximately 800 nm to 1800 nm, and a blocking level greater than optical density (OD) of 2 over a spectral range of approximately 300 nm to 600 nm. As used herein, optical density is a measure of absorbance of light through a material, defined as a ratio of the light intensity incident upon the material and the intensity of the light transmitted through the material.

In accordance with disclosed examples, a method of forming a hydrogenated silicon carbide (SiC:H) layer is provided. For example, SiC:H is deposited by sputtering (or other suitable technique) using a silicon sputtering target. An optical filter can be formed using the SiC:H layer, resulting in a smaller angle shift and a lower stack thickness than other stacked filters. The SiC:H layered optical filter can also perform in lower wavelengths than compared with other interference filters that employ Si and $SiO_2$ layers. In some examples, various optical properties of the SiC:H layer can be introduced by tuning a flow rate of methane ($CH_4$) during the formation process.

These and other features of the present disclosure will become more fully apparent from the following description and appended claims, as set forth hereinafter.

The foregoing summary is not intended to summarize each potential embodiment or every aspect of the present disclosure.

BRIEF DESCRIPTION OF THE DRAWINGS

To further clarify the above and other features of the present disclosure, a more particular description of the subject matter will be rendered by reference to specific examples thereof, which are illustrated in the appended drawings. It is appreciated that these drawings depict only some examples of the subject matter and are therefore not to be considered limiting of its scope.

Figure 1:
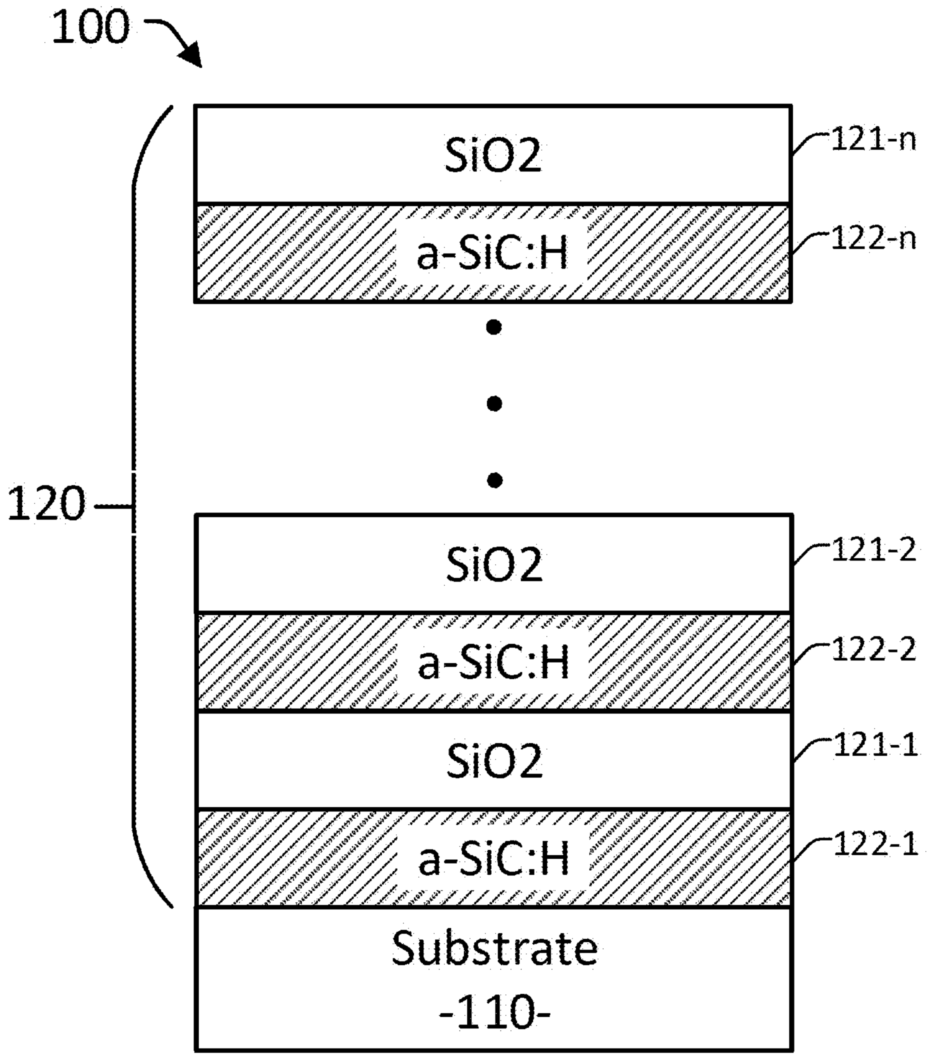
FIG. 1 illustrates a diagram of an example optical filter based on hydrogenated silicon carbide according to the present disclosure.

The invention is more completely described by the accompanying drawings. These figures may merely be schematic representations of current filters, assemblies, facilities or methods to enhance understanding of the disclosed concepts.

DETAILED DESCRIPTION OF THE DISCLOSURE

Optical filters are disclosed herein that exhibit low angular shifts, high passband transmittances, and broad workable wavelength ranges. Such optical filters are desirable in a variety of applications, such as three-dimensional sensing technologies that benefit from wide angle devices. In some example Fabry-Perot type optical filters, a difference in high and low refractive indexes of alternating layers in a stacked device can determine the angular shift. Moreover, the extinction coefficient and the absorption threshold wavelength are configured to control the passband transmittance and the lowest workable wavelength, respectively, of the optical filter.

Some example optical filters employ one or more layers of $Ta_2O_5/SiO_2$ designed to work in both visible and near infrared (IR) spectra. Such devices allow the passband transmittance to reach a high level, but the angular shift of the passband center wavelength is substantially large due to the modest difference in refractive indexes between layers. While in the pair of $Si/SiO_2$ with large refractive index silicon layers, the large extinction coefficient and long absorption threshold wavelength of silicon resulting from the small optical bandgap restrain the passband transmittance and even lower wavelength applications.

Some solutions seek to hydrogenate the silicon to prepare hydrogenated silicon. Among the disadvantages is that the extinction coefficient of the hydrogenated silicon below 900 nm increases dramatically with a decreasing wavelength. To some extent, the transmittance of the filters with passband below 900 nm will be affected. The absorption threshold wavelength of the SiC:H near 650 nm exhibits a transmittance level of approximately 50%. Thus, the transmittance level would be reduced in the passband below 900 nm, and the working wavelength range would be limited as a result.

Another solution is to prepare hydrogenated silicon with added nitrogen. Among the disadvantages with this approach is that the refractive index of the hydrogenated silicon with added nitrogen has a limited range of 1.9 to 2.7, which is smaller than hydrogenated silicon with a refractive index greater than 3. As a result, the angular shift of the center wavelength is not small enough for many desired applications.

Therefore, preparing a material that possesses larger refractive index, smaller extinction coefficient, and increased absorption threshold wavelength than the silicon is of great interest for optical filters mentioned above.

The disclosed optical filter benefits from the properties of SiC:H, layers of which can be prepared by the disclosed methods and systems. The resulting layer of SiC:H yields a refractive index in a wide range, of approximately 1.65 to 4.80, over a wide spectral range, of approximately 800 nm to 1800 nm.

The disclosed optical filter, employing alternating layers of silicon and silicon dioxide, provides a number of advantages, including that the number of alternating layers in the stack is greatly reduced (e.g., by almost half) in comparison to an optical filter comprising a stack of alternating $Ta_2O_5$ and silicon dioxide layers.

In some examples, a method of making an optical filter employs depositing layers of SiC:H using a sputtering system on a clean substrate. In such a method, the high refractive index layer of SiC:H is deposited by sputtering using a silicon sputtering target, in which the flow rate of methane ($CH_4$) can be adjusted to tailor one or more optical properties of the SiC:H material layer.

The SiC:H material layer exhibits a high refractive index, and is paired with another material layer (e.g., $SiO_2$) in a stack, often in a pattern of alternating layers. The optical filter can have a smaller angle shift and a lower stack thickness than conventional filters. It can also extend the applications into the lower wavelength compared with the interference filter using Si and $SiO_2$ layers alone. The disclosure offers a variety of methods for realizing diverse optical properties of the hydrogenated silicon carbide (SiC:H) layer required by the technology via tuning the flow rate of methane ($CH_4$).

In some examples, the first side of a bandpass filter is a filter stack composed of alternating layers of high refractive index materials and low refractive index materials. The high refractive index material is hydrogenated silicon carbide (SiC:H), and a refractive index is 3.46 near 905 nm. An example low refractive index material is $SiO_2$, with a refractive index of 1.46 near 905 nm. The total layer number of the filter stack can be 2, 4, 6, 8, 10, 12, 14, 16, 18, 20, 22, 24 or more. For a stack with 22 layers, a total physical thickness can be approximately 3.7 microns. The steepness of the transition band and the blocking depth of the filter stack are determined by the first side.

The disclosed bandpass filter is configured to have the passband over the spectral range of approximately 800 nm to approximately 1800 nm. The angle shift of center wavelength is approximately 13 nm at incident angles from about 0° and changing to 30° in bandpass filter. Bandpass filter may be associated with a bandpass centered at approximately 950 nm and may be associated with a bandpass full width half maximum (FWHM) at approximately 50 nm at an incident angle of 0°.

As used herein, a bandpass filter is an optical filter configured to selectively transmit a portion of an incident spectrum while rejecting all other wavelengths. The transmitted portion can be referred to as the passband frequency.

As used herein, transmittance of a material corresponds to the material's effectiveness in transmitting radiant energy, typically defined as a percentage of the incident spectrum.

In the following described examples, an optical filter is provided with hydrogenated silicon carbide (SiC:H) as a high refractive index material, thereby resulting in a smaller angle shift, a lower absorption threshold wavelength, and a smaller stack thickness in comparison to other solutions (e.g., optical filters employing $Ta_2O_5$).

Turning to the figures, FIG. 1 illustrates an example optical filter 100, such as an interference filter, including alternating layers of hydrogenated silicon carbide (SiC:H) and silicon dioxide ($SiO_2$). Here, the $SiO_2$ layer has a first refractive index that is smaller than a refractive index of the SiC:H layer. As provided in FIG. 1, the optical filter 100 includes a substrate 110 (e.g., a clean substrate) and an optical filter stack 120. The optical filter stack 120 includes a number of high refractive index layers 121-1 through **121-*n* (where n>2) and a number of low refractive index layers 122-1 through 122-*n*** (where n>2).

In some examples, the layers 121 may include a SiC:H material. The refractive index of layers 121 range from approximately 1.65 to 4.80 over a spectral range of approximately 800 nm to 1800 nm. Layers 122 may include a $SiO_2$ material. Additionally or alternatively, layers 122 may include one or more materials including $TiO_2$, $Nb_2O_5$, $Ta_2O_5$, $SiO_2$, $Si_xN_y$, or $SiO_xH_y$, as a list of non-limiting examples. The number of layers and stacking order of the optical filter 100 provided in FIG. 1 are for illustrative purposes only, and can be designed to include more or fewer layered, alternating pairs of material, in accordance with requirements of a particular application.

Figure 2:
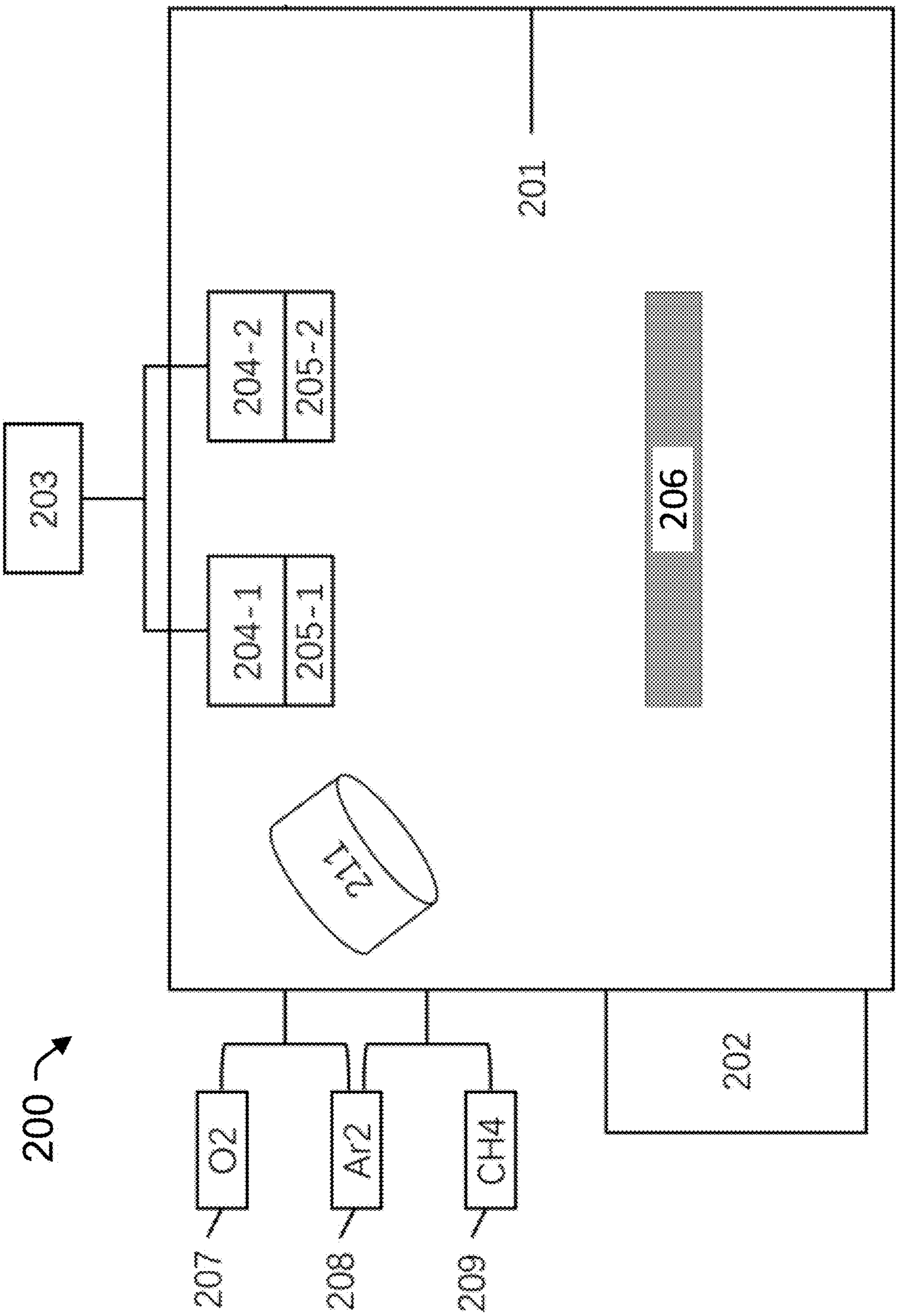
FIG. 2 illustrates a diagram of an example sputter deposition system for fabricating hydrogenated silicon carbide based optical filters according to the present disclosure.

In disclosed examples, the optical filter stack 120 can be deposited on a surface by vacuum sputtering. As shown in the example of FIG. 2, a middle frequency (MF) magnetron sputtering system 200 that can be used to deposit one or more layers of material to form the optical filter stack 120. The sputtering system 200 includes chamber 201, connected to a vacuum pumping system 202, which may be or include one or more mechanical pumps, diffusion pumps, condensation pumps, and/or molecular pumps, as a list of non-limiting examples. In some examples, the vacuum pumping system 202 is a combination of a mechanical pump and a molecular pump. A MF power supply 203 can include one or more lines to the sputtering target 206. The power supply 203 can generate an output power at a range at or near the kW level, with a frequency of approximately 5 to 100 KHz. In some examples, the output power of supply 203 is between approximately 8 to 10 KW, with an operating frequency of approximately 40 KHz.

The sputtering unit 200 of FIG. 2 includes one or more magnets 204-1 and 204-2 and/or one or more silicon targets 205-1 and 205-2, which may be paired with the magnets. Magnets 204 are located adjacent to targets 205 and play a role in constraining electron orbits. Here, targets 205-1 and 205-2 are illustrated as having a similar size, although different sizes can be used. When sputtering layers 121, substrate 206 (e.g., substrate 110 of FIG. 1) is orientated towards targets 205 for deposition of a layer of material. One or more gases may be used, such as $O_2$, $Ar_2$, and/or methane ($CH_4$), corresponding to Gas 207, Gas 208, and Gas 209, respectively. These gases enter the vicinity of the sputtering unit 200 in chamber 201 through pipelines connecting the gas sources to the chamber. The pipelines are equipped with one or more flow meters to adjust and monitor the gas flow into the chamber 201. In some examples, system 200 is equipped with an auxiliary plasma source 211. The gas can partially or completely enter the chamber through auxiliary plasma source 211 to increase the plasma activation and improve the film-forming quality.

Through this system and process, a stacked optical filter having alternating layers of material can be achieved. In creating a layer of SiC:H, the silicon absorption threshold is blue shifted with increasing hydrogen concentrations, and the passband of the optical filter with the spectral range of approximately 800 nm to 1200 nm is achievable. The SiC:H layer has strong absorption in wavelengths below 600 nm, which yields a high blocking level below 600 nm.

Although magnetron sputtering deposition is described herein, other deposition methods, such as ion beam sputtering, are also considered. Different materials with different properties are also possible for specific applications.

Figure 3A:
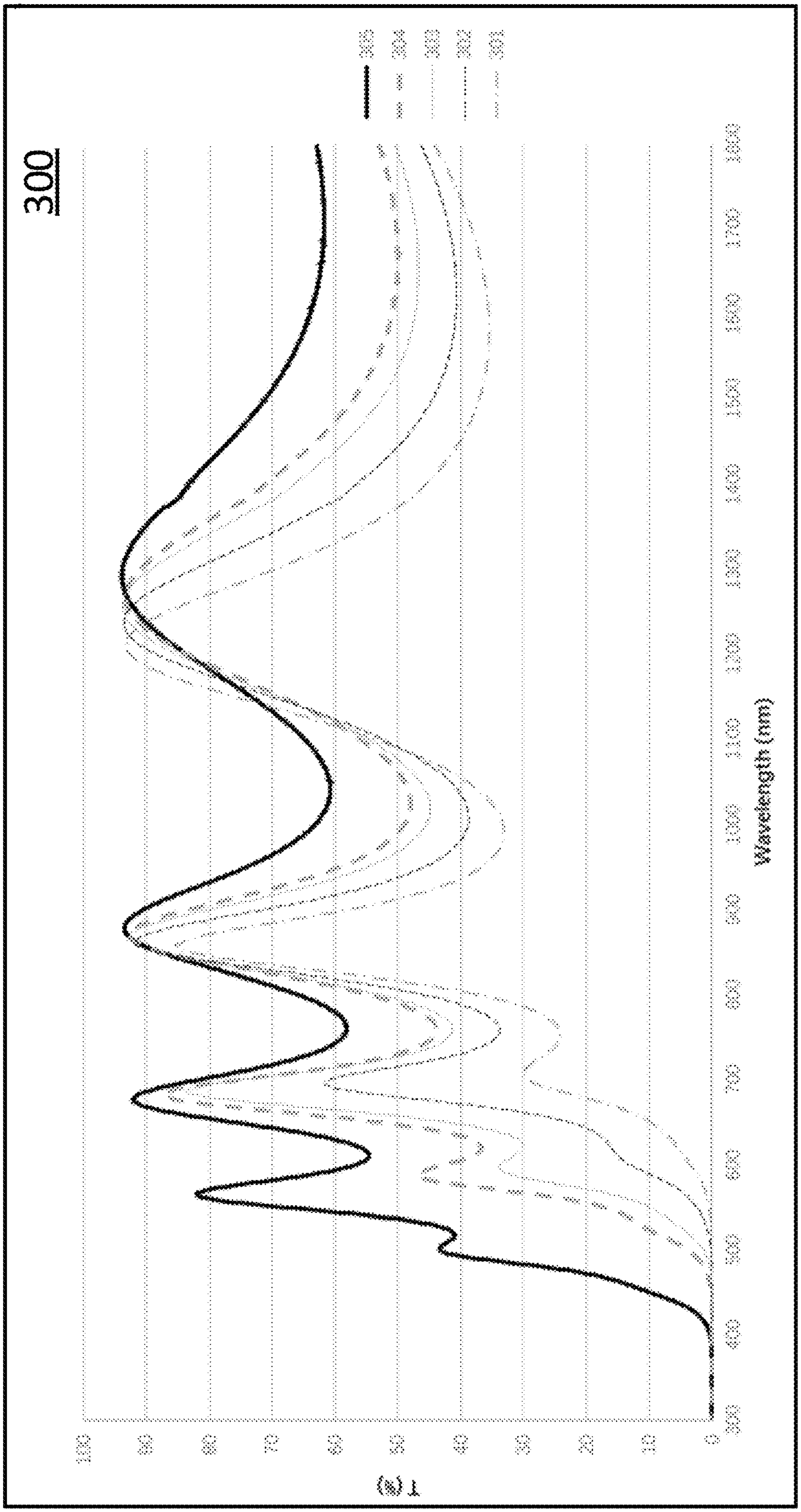
FIG. 3A illustrates a diagram of the characterized relationship between the flow rates of methane ($CH_4$) and the transmittance spectra, wherein the x-axis is wavelength (nm) and the y-axis is transmittance (%) according to the present disclosure.

FIGS. 3A to 3F provide graphical illustrations of characteristics of SiC:H single-layer films. FIG. 3A provides a chart 300 illustrating the relationship between flow rates of methane ($CH_4$) during a deposition process and transmittance spectra of single-layer SiC:H film over a spectral range of approximately 300 nm to 1800 nm. Here, the x-axis represents the wavelength (nm) and the y-axis is transmittance (T %).

Example films 301 to 305 are single-layer films with approximately 3.5 quarter wavelength optical thickness at a wavelength of approximately 950 nm. The flow rate of gas (e.g., from $CH_4$ gas source 209) is continuously increased in films 301 to 307, corresponding to 5 sccm, 15 sccm, 25 sccm, 30 sccm and 50 sccm, respectively. As shown in chart 300, the spectral peaks of films 301 to 305 are approximately 30.0%, 61.7%, 83.6%, 87.2% and 92.1%, respectively, over a spectral range of approximately 600 nm to 750 nm. Furthermore, the transmittance of films 301 to 305 increases with an increase in $CH_4$ flow over a spectral range of approximately 600-750 nm. In other words, transmittance is positively correlated with introduction of $CH_4$ below 750 nm.

Figure 3B:
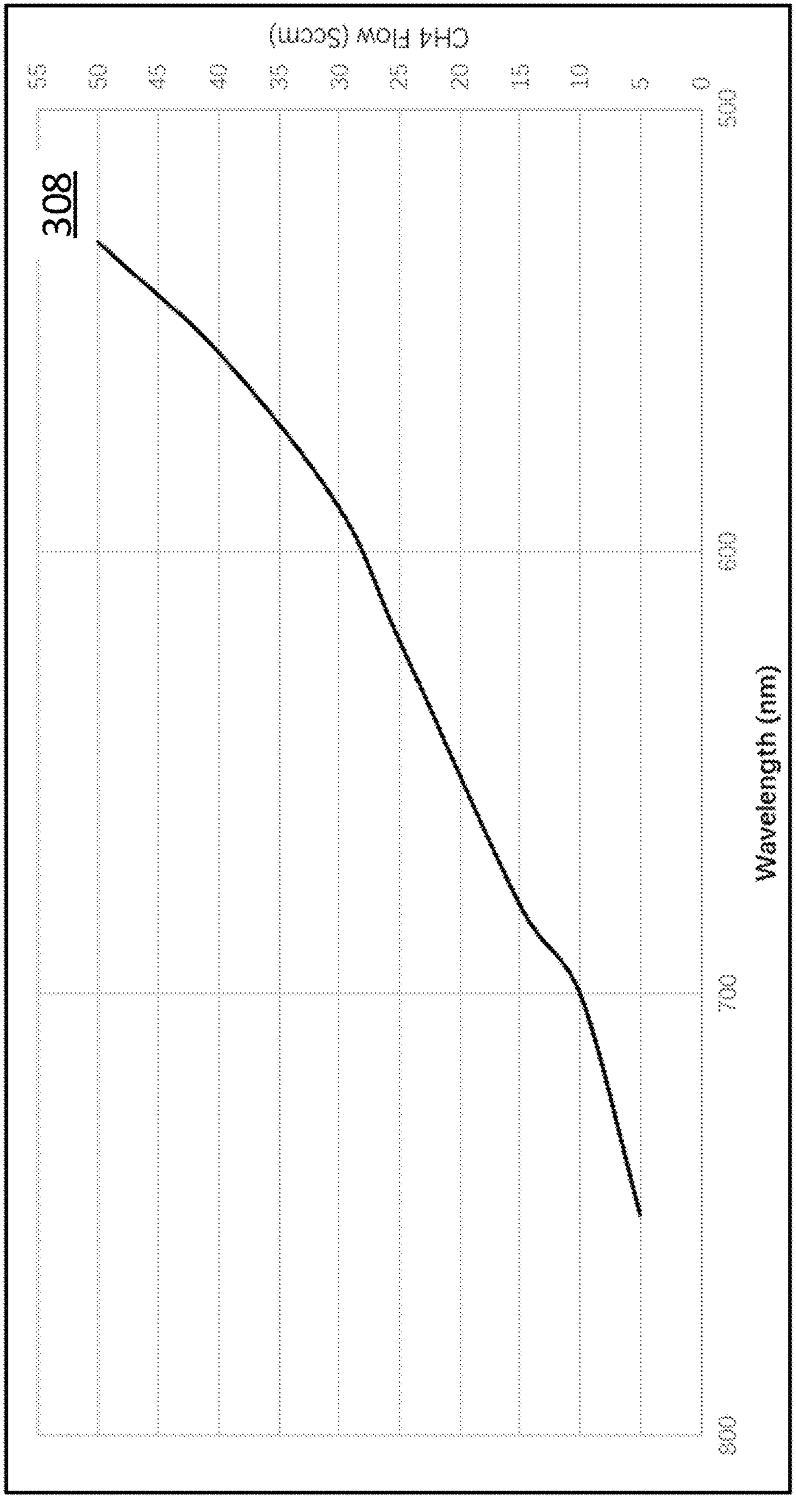
FIG. 3B illustrates a diagram of the characterized relationship between the flow rates of methane ($CH_4$) and the absorption threshold wavelengths at a transmittance level of 50% according to the present disclosure.

FIG. 3B illustrates a chart 308 showing a relationship between flow rates of $CH_4$ and an absorption threshold wavelengths at a transmittance level of approximately 50%, where the x-axis is wavelength (nm) and the y-axis is flow rate of methane (sccm). Furthermore, the absorption threshold wavelength is reduced from about 800 nm to about 530 nm by increasing the $CH_4$ flow rate at a transmittance level of approximately 50%. Compared with the SiC:H in which the absorption threshold is about 650 nm at a transmittance level of 50%, the SiC:H has the further reduced absorption threshold wavelength.

Figure 3C:
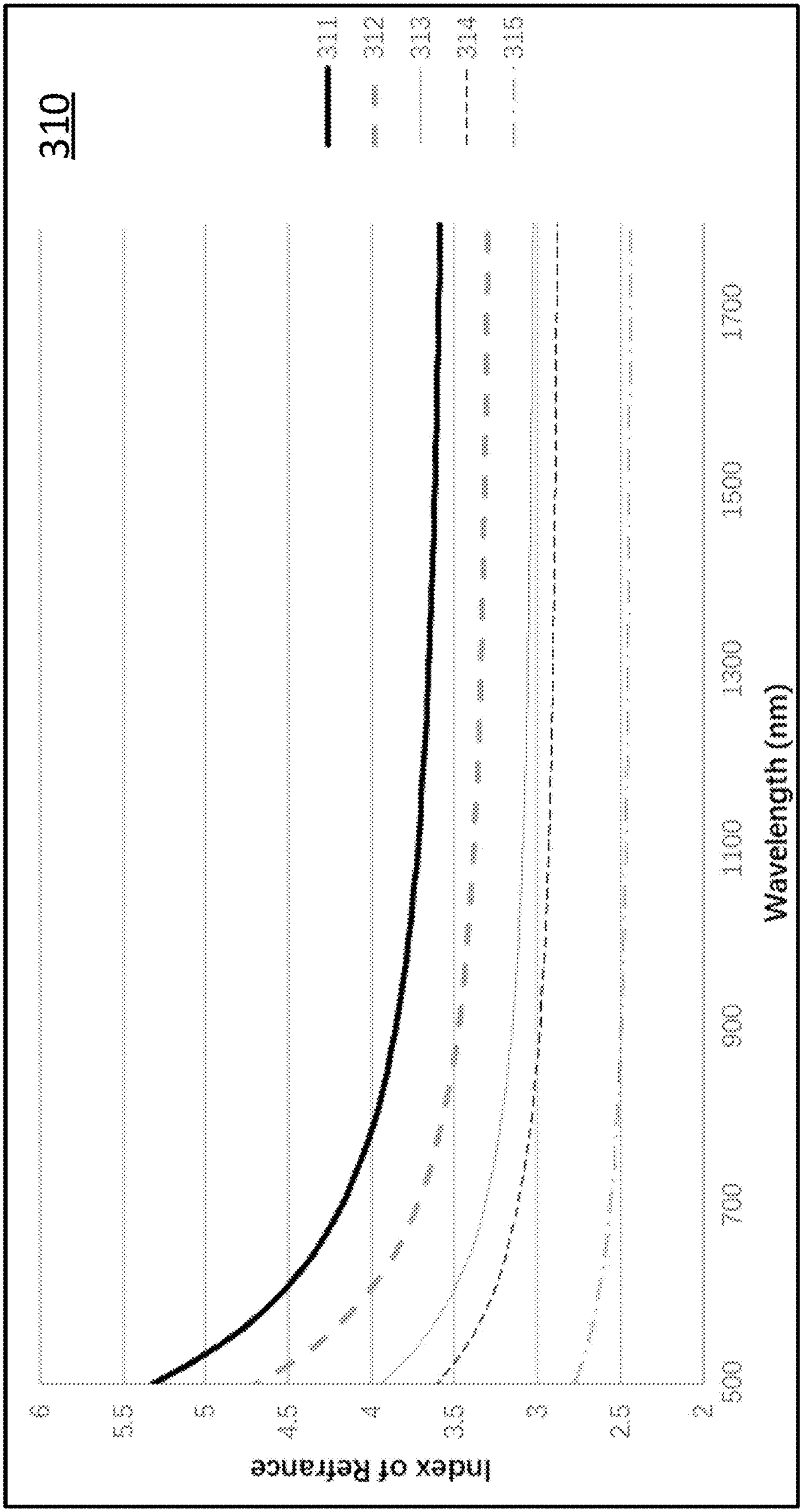
FIG. 3C illustrates a diagram of the characterized relationship between the flow rates of methane ($CH_4$) and the refractive indexes at wavelengths of 500 nm to 1800 nm according to the present disclosure.

FIG. 3C illustrates chart 310 showing a relationship between flow rates of $CH_4$ and the refractive indexes of several materials at wavelengths of approximately 500 nm to approximately 1800 nm. The flow rate of $CH_4$ (e.g., gas 209) is continuously increased in forming films 311 to 315, corresponding to 5 sccm, 15 sccm, 25 sccm, 30 sccm and 50 sccm, respectively. The refractive indexes of films 311 to 315 are greater than approximately 3.58, 3.29, 3.02, 2.88 and 2.43, respectively, over a spectral range of approximately 800 nm to approximately 1800 nm.

Figure 3D:
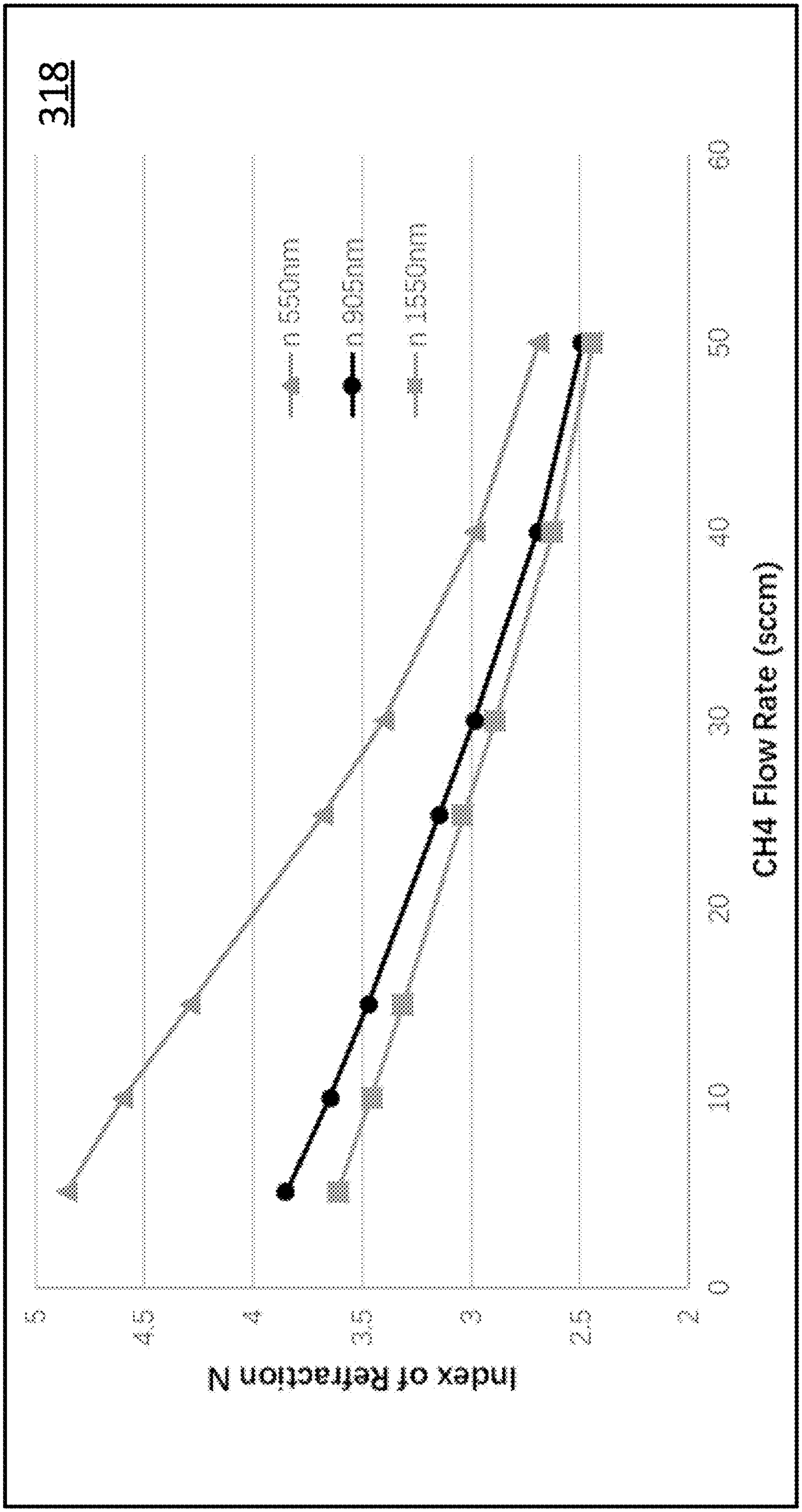
FIG. 3D illustrates a diagram of the characterized relationship between the flow rates of methane ($CH_4$) and the refractive indexes at wavelength of 750 nm, 905 nm, and 1500 nm according to the present disclosure.

Chart 318 illustrated in FIG. 3D shows the relationship between the flow rates of $CH_4$ and the refractive indexes at wavelengths of approximately 750 nm, 905 nm, and 1500 nm. In other words, the refractive index of SiC:H trends downward with an increase in the $CH_4$ flow rate.

Figure 3E:
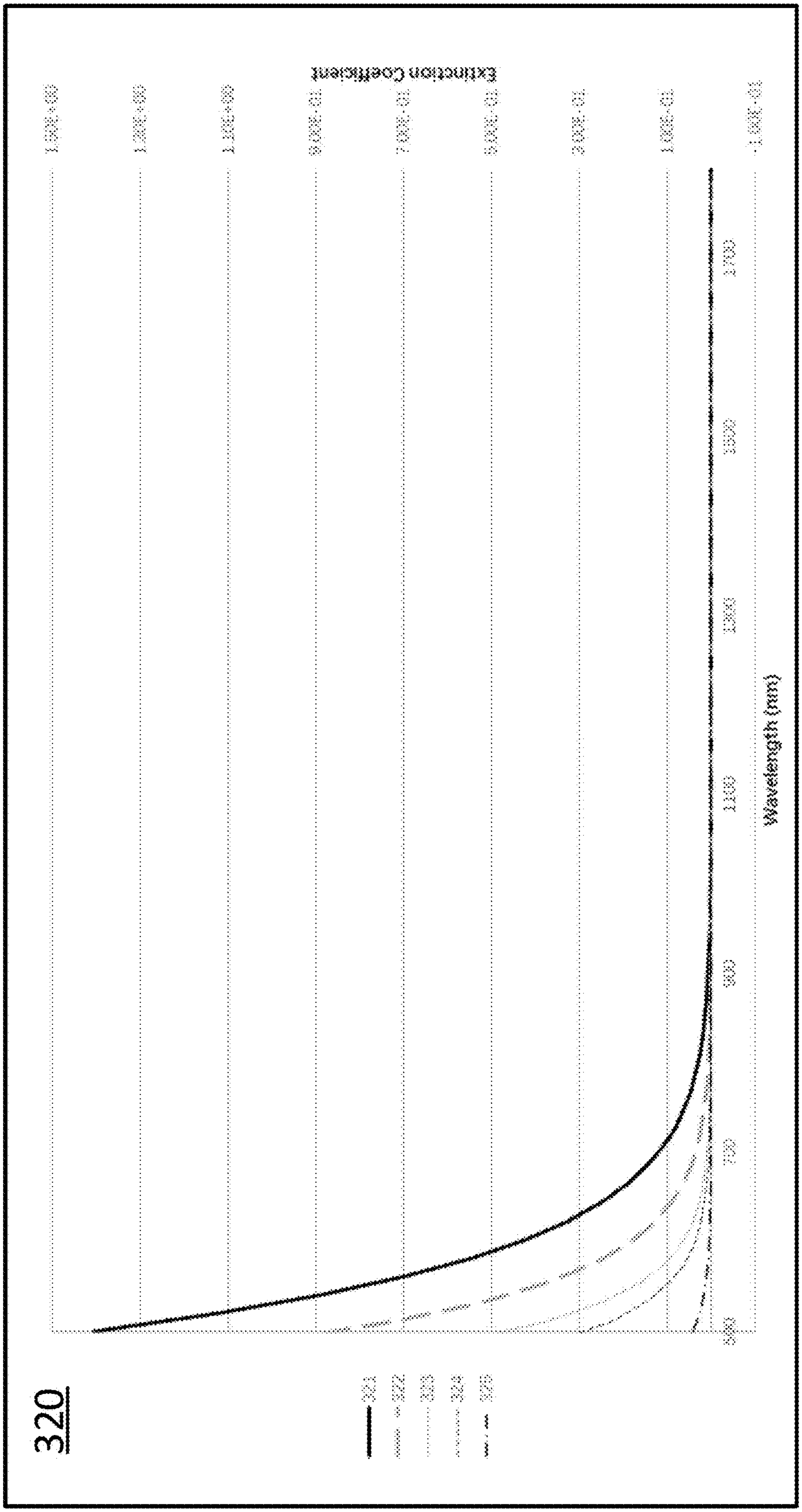
FIG. 3E illustrates a diagram of the characterized relationship between the flow rates of methane ($CH_4$) and the extinction coefficients at wavelengths of 500 nm to 1800 nm according to the present disclosure.

Chart 320 illustrated in FIG. 3E shows the relationship between the flow rates of $CH_4$ and extinction coefficients at wavelengths of approximately 500 nm to 1800 nm. The flow rate of $CH_4$ (e.g., gas 209) is continuously increased in films 321 to 325, corresponding to 5 sccm, 15 sccm, 25 sccm, 30 sccm and 50 sccm, respectively. Furthermore, the extinction coefficients of films 321 to 327 are less than approximately 0.04691, 0.01420, 0.00280, 0.00203 and 0.00002 respectively, over a spectral range of approximately 750 nm to approximately 1800 nm, and are less than approximately 0.02628, 0.00666, 0.00112, 0.00118, 0.00001, respectively, over a spectral range of approximately 800 nm to approximately 1800 nm. As shown in FIG. 3E, the extinction coefficient decreases with an increase in the $CH_4$ flow rate.

In accordance with disclosed examples, one or more optical properties of the SiC:H can be customized by adjustments to the flow rate of $CH_4$. For instance, the refractive index n and the extinction coefficient k of the SiC:H can be reduced by increasing the flow rate of $CH_4$ during deposition. The refractive index n and the extinction coefficient k of the SiC:H material can be increased by decreasing the flow rate of $CH_4$ during deposition. A high transmittance uses a relatively large amount of $CH_4$ to achieve a low extinction coefficient, while a small angle shift uses a relatively small amount of $CH_4$ to obtain a high refractive index. In other words, application of a small amount of $CH_4$ during deposition may result in a decrease in transmittance through the filter passband yet with a small angle shift, while a large amount of $CH_4$ exhibits the opposite results (e.g., an increase in transmittance and a larger angle shift). Thus, a compromise exists between the refractive index and the extinction coefficient of the material.

In some examples, customizing the refractive index of the SiC:H material near a wavelength of about 905 nm in the range of 1.65 to 3.9 by only adjusting the $CH_4$ flow can be difficult. Empirically, the limit of the refractive index adjustment range near about 905 nm is approximately between 2.3 to 3.8. In addition, selection of the $CH_4$ flow rate is affected by the vacuum pumping speed of the sputtering system 200, the sputtering power of the target and the flow rate of the working gas. When adjusting the refractive index of the material by changing parameters such as sputtering power (e.g., sputtering yield) and working gas (e.g., flow of $Ar_2$ from gas 208), the basic principles are similar to those described with respect to adjustment of $CH_4$ flow.

Based on the above single-layer data, the interference filter composed of SiC:H material has good performance in the working wavelength range of approximately 800 nm to approximately 1800 nm, and even the working wavelength range can be extended to approximately 750 nm or less.

Figure 4:
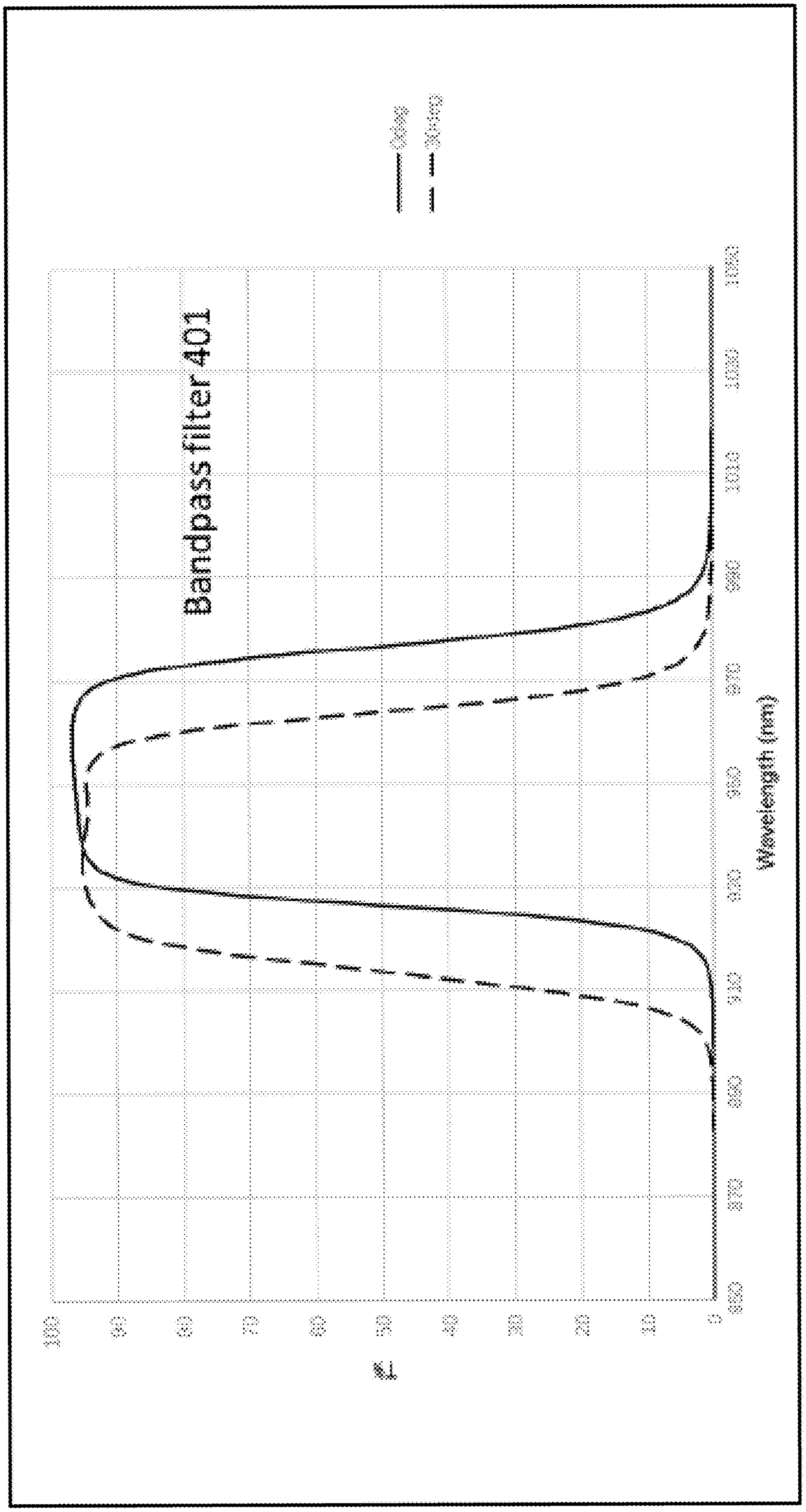
FIG. 4 illustrates a diagram of the transmittance spectra of an optical filter using SiC:H as the high refractive index material at incident angles of 0° and 30°, wherein the x-axis is wavelength (nm) and the y-axis is transmittance (%) according to the present disclosure.

FIG. 4 illustrates a chart 401 with characteristics relating to optical filters employing SiC:H as a high refractive index material. Chart 401 shows the transmittance spectra of an optical filter using SiC:H as the high refractive index at incident angles of approximately 0° and 30°, where the x-axis is wavelength (nm) and the y-axis is transmittance (T %). Bandpass filter 401 includes a stack having one or more pairs of layers, each layer having a SiC:H layer and a $SiO_2$ layer. In some examples, one or more pairs of layers may include or be arranged adjacent to an anti-reflective layer.

In some examples, the bandpass filter 401 is a filter stack with a first side composed of alternating layers of high refractive index material and low refractive index material (e.g., similar to layers 121 and 122 shown in optical filter 100 of FIG. 1). In the example of FIG. 4, the high refractive index material (SiC:H) has a refractive index of approximately 3.46 near 905 nm. The low refractive index material ($SiO_2$) has a refractive index of approximately 1.46 near 905 nm. In some examples, the filter stack has a total of 22 layers, and a total physical thickness is approximately 3.7 microns.

The sharpness of the rise (e.g., the steepness) of the transition band and the blocking depth of the filter stack are determined by the first side composed of alternating layers of material. The design of the filter stack is defined by 5 cavities. For an even sharper ramp, the number of cavities can be increased. In other words, the number of layers within the filter stack is increased, which may increase manufacturing difficulty.

On a second side of the bandpass filter 401, an anti-reflection (AR) coating stack is deposited to achieve a transmission improvement in the passband around 950 nm, and to reduce the reflection of the back surface. In some examples, the AR coating stacks are alternately stacked with one or more of a $Ta_2O_5$ layer and a $SiO_2$ layer. In an example, the AR coating stacks include 5 layers.

The disclosed bandpass filter 401 is configured to have the passband over the spectral range of approximately 800 nm to approximately 1800 nm. The angle shift of center wavelength is approximately 13 nm at incident angles from about 0° and changing to 30° in bandpass filter 401. Bandpass filter 401 may be associated with a bandpass centered at approximately 950 nm and may be associated with a bandpass full width half maximum (FWHM) at approximately 50 nm at an incident angle of 0°.

Compared with traditional filters using $SiO_2$ and $Ta_2O_5$ as the layer materials, the disclosed bandpass filter 401 using a high refractive index such as SiC:H has significant advantages. For example, the number of layers of bandpass coating is significantly reduced (e.g., by more than half), and the resulting filter yields a smaller angular drift. This means that manufacture of bandpass filter 401 is relatively simple, resulting in a filter with a high production efficiency, a large yield, and good filtering performance.

Figure 5:
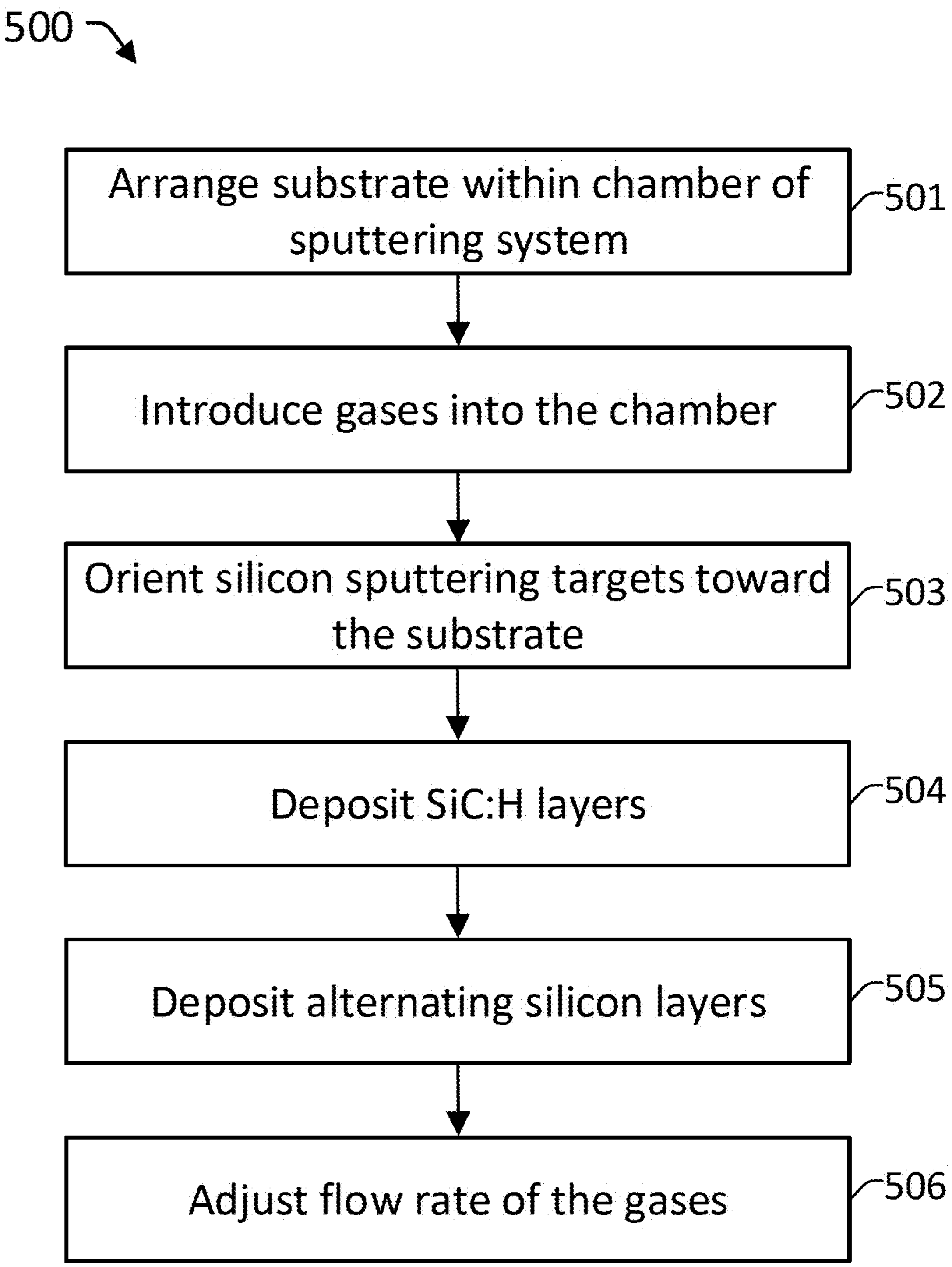
FIG. 5 is a flow diagram of a process for making an optical filter according to the present disclosure.

FIG. 5 is a flow diagram of a process for making an optical filter, in accordance with an example embodiment of the disclosure. This process is shown in the flow diagram of FIG. 5, starting with step 501 by arranging a substrate (e.g., a clean substrate) within a chamber of a sputtering system. In step 502, one or more gases are introduced into the chamber.

In step 503, one or more silicon sputtering targets are oriented toward the substrate. In step 504, the sputtering system is activated to deposit one or more layers of hydrogenated silicon carbide (SiC:H) material onto the substrate. In step 505, the sputtering system is activated to deposit one or more layers of silicon material (e.g., $TiO_2$, $Nb_2O_5$, $Ta_2O_5$, $SiO_2$, $Si_xN_y$ or $SiO_xH_y$) onto the substrate. For example, the layers of SiC:H and silicon materials can be alternated to form a stack, which may include 22 layers, or more, or less.

In step 506, a flow rate of the one or more gases is adjusted in order to tailor one or more optical properties of the SiC:H material layers (and/or the one or more optical properties of the silicon material layer). In some examples, the one or more gases includes methane ($CH_4$). The resulting optical filter includes a number of SiC:H layers that exhibit desired optical properties, including a refractive index in the range of approximately 1.65 to 4.80.

In disclosed examples, an optical filter includes a substrate, and an interference filter that includes a first material layer and a second material layer stacked on a first side of the substrate, wherein the first material layer comprises silicon oxide and has a first refractive index, and the second material layer comprises a hydrogenated silicon carbide (SiC:H) material with a second refractive index.

In some examples, the first refractive index of the first material layer is less than the second refractive index of the second material layer.

In some examples, the second refractive index of the SiC:H material is in the range of approximately 1.65 to 4.80, over a wide spectral range of approximately 800 nm to 1800 nm.

In some examples, the first material layer includes one or more of $TiO_2$, $Nb_2O_5$, $Ta_2O_5$, $SiO_2$, $Si_xN_y$ or $SiO_xH_y$.

In some examples, the optical filter includes one or more anti-reflective layers.

In some examples, the interference filter includes a plurality of alternating pairs of the first material layer and the second material layer arranged as a stack on the substrate.

In some examples, the substrate comprises a transparent glass material.

In some examples, the interference filter is configured to yield a passband within a range between 800 nm to 1800 nm.

In some examples, the optical filter is configured to yield a blocking level that is greater than an optical density of 2 over a given spectral range.

In examples, the given spectral range is between 300 nm to 600 nm.

In some disclosed examples, a method of making an optical filter includes arranging a substrate within a chamber of a sputtering system, introducing one or more gases into the chamber, orienting one or more silicon sputtering targets toward the substrate, and activating the sputtering system to deposit one or more layers of hydrogenated silicon carbide (SiC:H) material onto the substrate.

In some examples, the method further includes adjusting a flow rate of the one or more gases to tailor the optical properties of the SiC:H material layer or layers. In some examples, the one or more gases includes methane ($CH_4$).

In some examples, the optical properties of the SiC:H material layers includes a refractive index in the range of approximately 1.65 to 4.80.

In some examples, the sputtering system is a magnetron sputtering deposition system.

In some examples, the sputtering system is a sputtering deposition system.

In some examples, an optical filter includes a first layer of a first material deposited on a substrate, and a second layer of a second material stacked on the first layer opposite the substrate, wherein the second material is a hydrogenated silicon carbide (SiC:H) material.

In some examples, the first material layer has a first refractive index, and the second material layer with a second refractive index greater than the first refractive index.

In some examples, the second refractive index of the SiC:H material is in the range of approximately 1.65 to 4.80, over a wide spectral range of approximately 800 nm to 1800 nm.

In some examples, the first material layer includes one or more of $TiO_2$, $Nb_2O_5$, $Ta_2O_5$, $SiO_2$, $Si_xN_y$ or $SiO_xH_y$.

In the drawings, similar features are denoted by the same reference signs throughout.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

The invention claimed is:

1. An optical filter comprising:

a substrate comprising a first side and a second side opposite the first side;

an interference filter that includes a first material layer and a second material layer stacked on the first side of the substrate; and an anti-reflection coating on the second side of the substrate;

wherein the first material layer comprises silicon oxide and has a first refractive index, and the second material layer comprises a hydrogenated silicon carbide (SiC:H) material with a second refractive index.

2. The optical filter of claim 1, wherein the first refractive index of the first material layer is less than the second refractive index of the second material layer.

3. The optical filter of claim 2, wherein the second refractive index of the SiC:H material is in the range of approximately 1.65 to 4.80, over a wide spectral range of approximately 800 nm to 1800 nm.

4. The optical filter of claim 1, wherein the first material layer includes one or more of $TiO_2$, $Nb_2O_5$, $Ta_2O_5$, $SiO_2$, $Si_xN_y$ or $SiO_xH_y$.

5. The optical filter of claim 1, wherein the anti-reflective coating comprises alternating layers of $Ta_2O_5$ and $SiO_2$.

6. The optical filter of claim 1, wherein the interference filter includes a plurality of alternating pairs of the first material layer and the second material layer arranged as a stack on the substrate.

7. The optical filter of claim 1, wherein the substrate comprises a transparent glass material.

8. The optical filter of claim 1, wherein the interference filter is configured to yield a passband within a range between 800 nm to 1800 nm.

9. The optical filter of claim 1, wherein the optical filter is configured to yield a blocking level that is greater than an optical density of 2 over a given spectral range.

10. The optical filter of claim 9, wherein the given spectral range is between 300 nm to 600 nm.

11. A method of making an optical filter, the method comprising:

arranging a substrate within a chamber of a sputtering system;

forming an interference filter on a first aide of the substrate; and providing an anti-reflective coating on a second side of the substrate;

wherein the forming the interference filter comprises alternatingly forming first material layers and forming second material layers stacked on a first side of the substrate;

wherein forming one or more of the second material layers includes:

introducing one or more gases into the chamber;

orienting one or more silicon sputtering targets toward the substrate; and activating the sputtering system to deposit a respective second material layer of hydrogenated silicon carbide (SiC:H) material onto a first side of previously deposited first material layer of the first material layers such that the respective second material layer contacts the previously deposited first material layer; and wherein forming one or more of the first material layers includes depositing a respective first material layer onto a first side of a previously deposited second material layer such that the respective first material layer contacts the previously deposited second material layer.

12. The method of claim 11, further comprising adjusting a flow rate of the one or more gases to tailor optical properties of the one or more second material layers of hydrogenated silicon carbide (SiC:H) material.

13. The method of claim 12, wherein the one or more gases includes methane ($CH_4$).

14. The method of claim 12, wherein the optical properties of the one or more second material layers of hydrogenated silicon carbide (SiC:H) material includes a refractive index in the range of approximately 1.65 to 4.80.

15. The method of claim 11, wherein the sputtering system is a magnetron sputtering deposition system.

16. The method of claim 11, wherein the sputtering system is a sputtering deposition system.

17. An optical filter comprising:

a substrate comprising a first side and a second side opposite the first side;

a first layer of a first material on the first side of a substrate, wherein the first layer comprises a first side and a second side opposite the first side; and a second layer of a second material on the first layer, wherein the second layer comprises a first side and a second side opposite the first side, and wherein the second side of the second layer contacts the first side of the first layer;

a third layer of the first material on the second layer, wherein the third layer comprises a first side and a second side opposite the first side, and wherein the second side of the third layer contacts the first side of the second layer; and an anti-reflective coating on the second side of the substrate:

wherein the second material is a hydrogenated silicon carbide (SiC:H) material; and wherein the first material layer has a first refractive index, and the second material layer with a second refractive index greater than the first refractive index.

18. The optical filter of claim 17, wherein the second refractive index of the SiC:H material is in the range of approximately 1.65 to 4.80, over a wide spectral range of approximately 800 nm to 1800 nm.

19. The optical filter of claim 17, wherein the first material layer includes one or more of $TiO_2$, $Nb_2O_5$, $Ta_2O_5$, $SiO_2$, $Si_xN_y$, or $SiO_xH_y$.

20. The optical filter of claim 17, wherein the anti-reflective coating comprises alternating layers of $Ta_2O_5$ and $SiO_2$.

* * * * *